(12) United States Patent
Trimmer

(10) Patent No.: US 11,129,360 B1
(45) Date of Patent: Sep. 28, 2021

(54) PORTABLE LEASH ANCHOR

(71) Applicant: Jace Trimmer, Huntington Beach, CA (US)

(72) Inventor: Jace Trimmer, Huntington Beach, CA (US)

( * ) Notice: Subject to any disclaimer, the term of this patent is extended or adjusted under 35 U.S.C. 154(b) by 155 days.

(21) Appl. No.: 16/687,849

(22) Filed: Nov. 19, 2019

(51) Int. Cl.
*A01K 1/04* (2006.01)

(52) U.S. Cl.
CPC ........................ *A01K 1/04* (2013.01)

(58) Field of Classification Search
CPC .......................... A01K 1/04; A01K 27/00–009
See application file for complete search history.

(56) References Cited

U.S. PATENT DOCUMENTS

| 3,070,068 | A | * | 12/1962 | Lonnelchapman | ...... | A01K 1/04 |
| | | | | | | 119/786 |
| 4,800,843 | A | * | 1/1989 | Wendling | ................. | A01K 1/04 |
| | | | | | | 119/780 |
| 5,441,017 | A | | 8/1995 | Lindsay | | |
| D421,822 | S | * | 3/2000 | Van Hale | ..................... | D30/154 |
| 6,446,903 | B1 | | 9/2002 | Bazan | | |
| 7,222,590 | B2 | | 5/2007 | Haddad | | |
| 7,730,852 | B2 | | 6/2010 | Kramer | | |
| 7,819,088 | B2 | | 10/2010 | Stern | | |
| 7,921,815 | B2 | | 4/2011 | Moran | | |
| D679,457 | S | | 4/2013 | Chance | | |
| 2009/0314225 | A1 | * | 12/2009 | Moran | ..................... | A01K 1/04 |
| | | | | | | 119/787 |
| 2015/0164042 | A1 | | 6/2015 | Moore | | |
| 2015/0327509 | A1 | * | 11/2015 | Hickling | ................... | A01K 1/04 |
| | | | | | | 119/786 |

FOREIGN PATENT DOCUMENTS

CA 2656852 6/2014

* cited by examiner

*Primary Examiner* — Timothy D Collins
*Assistant Examiner* — Madeline L Douglas
(74) *Attorney, Agent, or Firm* — Kyle A. Fletcher, Esq.

(57) ABSTRACT

The portable leash anchor is configured for use with one or more leashes. The one or more leashes attach to the portable leash anchor. The portable leash anchor is a portable structure that: a) forms a handle for the one or more leashes when walking an animal; and, b) creates a plurality of anchor points that temporarily anchor the one or more leashes to a fixed position. The portable leash anchor comprises a first hyoid and a second hyoid. The first hyoid attaches to the one or more leashes. The first hyoid is a stake structure that can be driven into the ground to form the plurality of anchor points. The second hyoid is a sheath structure that affixes with the first hyoid to form a square-shaped body when the portable leash anchor is used as a handle.

19 Claims, 5 Drawing Sheets

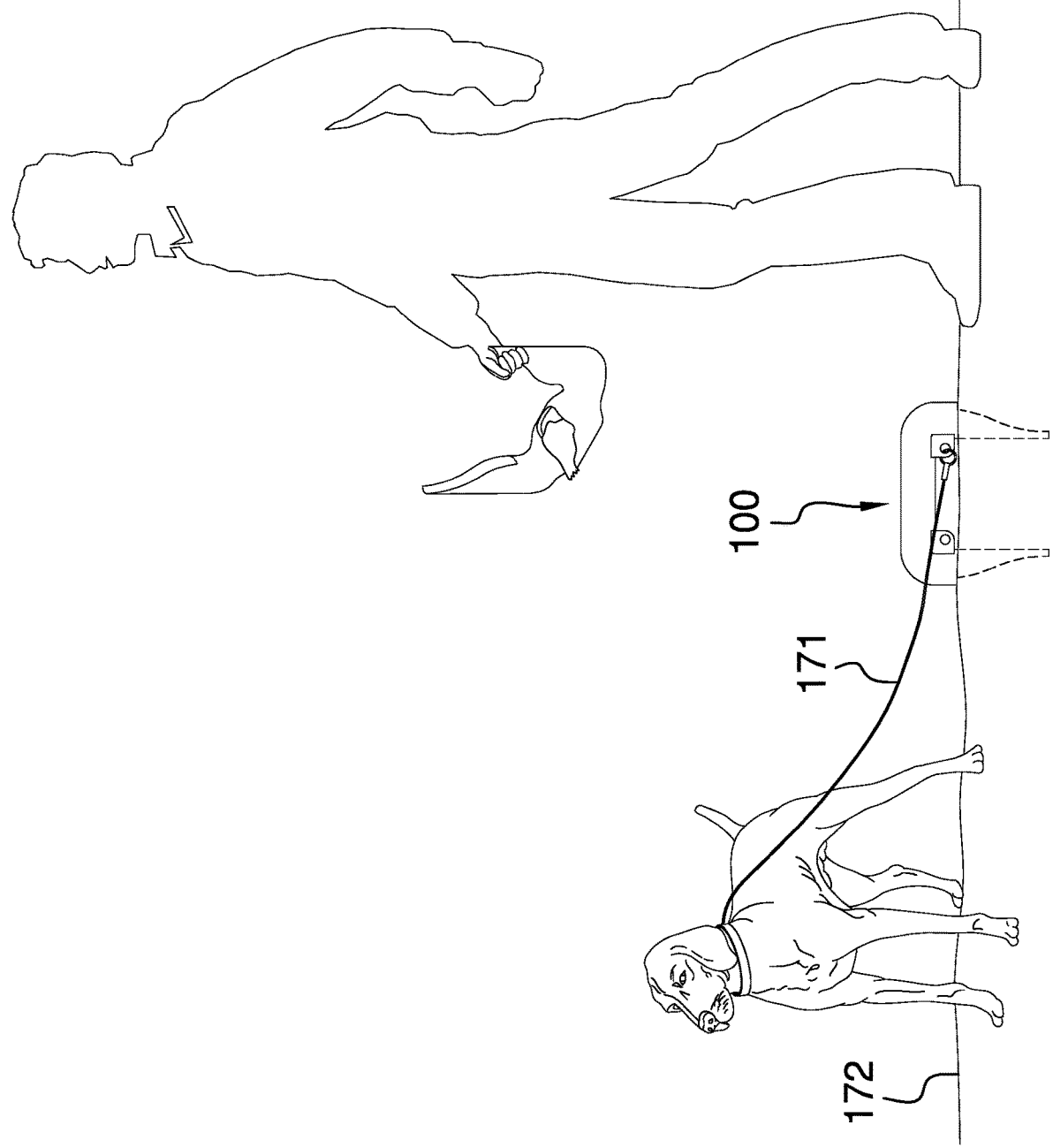

PORTABLE LEASH ANCHOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry, more specifically, a tethering pole configured for use in housing animals.

SUMMARY OF INVENTION

The portable leash anchor is configured for use with one or more leashes. The one or more leashes attach to the portable leash anchor. The portable leash anchor is a portable structure that: a) forms a handle for the one or more leashes when walking an animal; and, b) creates a plurality of anchor points that temporarily anchor the one or more leashes to a fixed position. The portable leash anchor comprises a first hyoid and a second hyoid. The first hyoid attaches to the one or more leashes. The first hyoid is a stake structure that can be driven into the ground to form the plurality of anchor points. The second hyoid is a sheath structure that affixes with the first hyoid to form a square-shaped body when the portable leash anchor is used as a handle.

These together with additional objects, features and advantages of the portable leash anchor will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable leash anchor in detail, it is to be understood that the portable leash anchor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable leash anchor.

It is therefore important that the claims be regarded as including such equivalent construction insofar as they do not depart from the spirit and scope of the portable leash anchor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a view of an embodiment of the disclosure in use.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
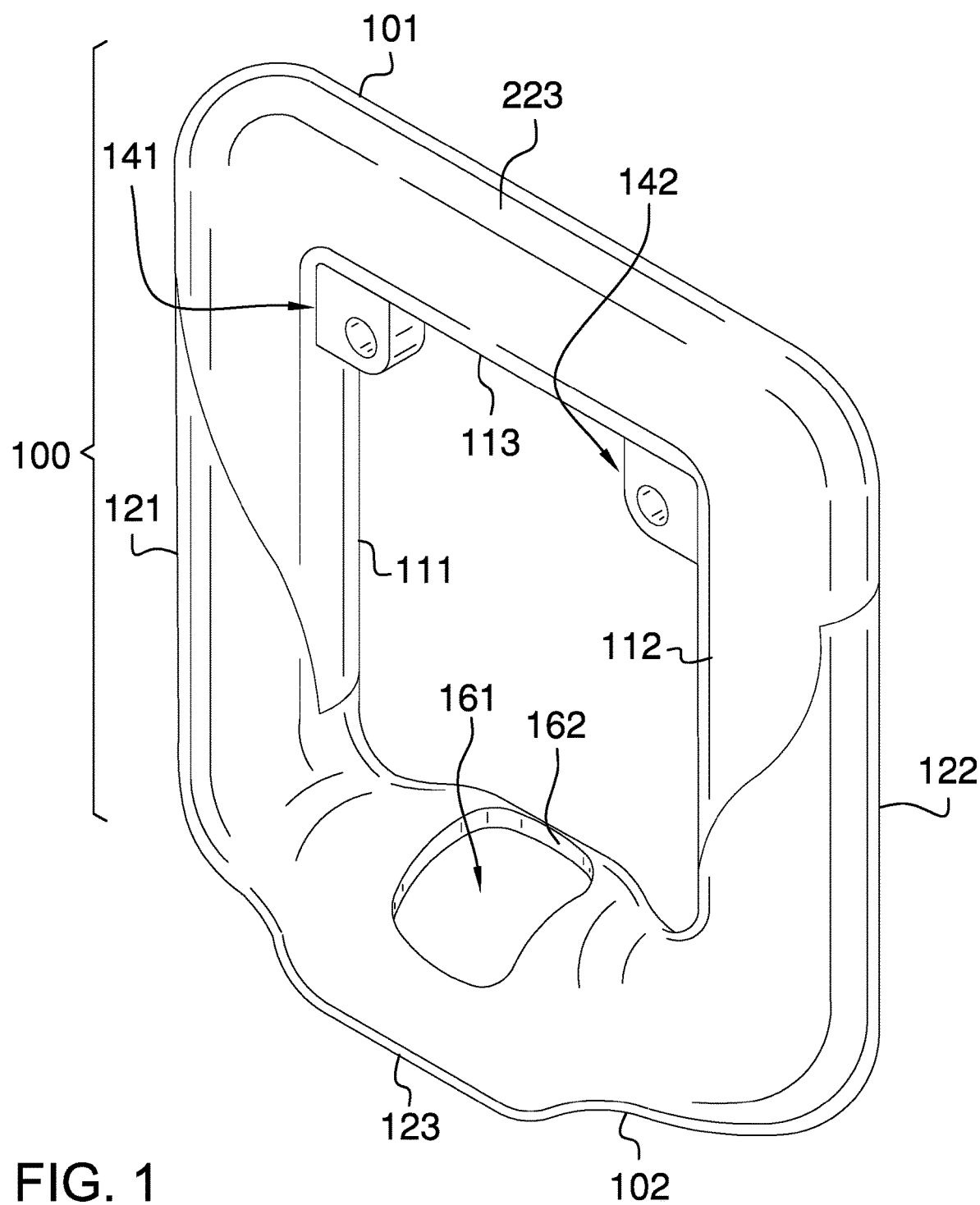
FIG. 1 is a perspective view of an embodiment of the disclosure.
Figure 2:
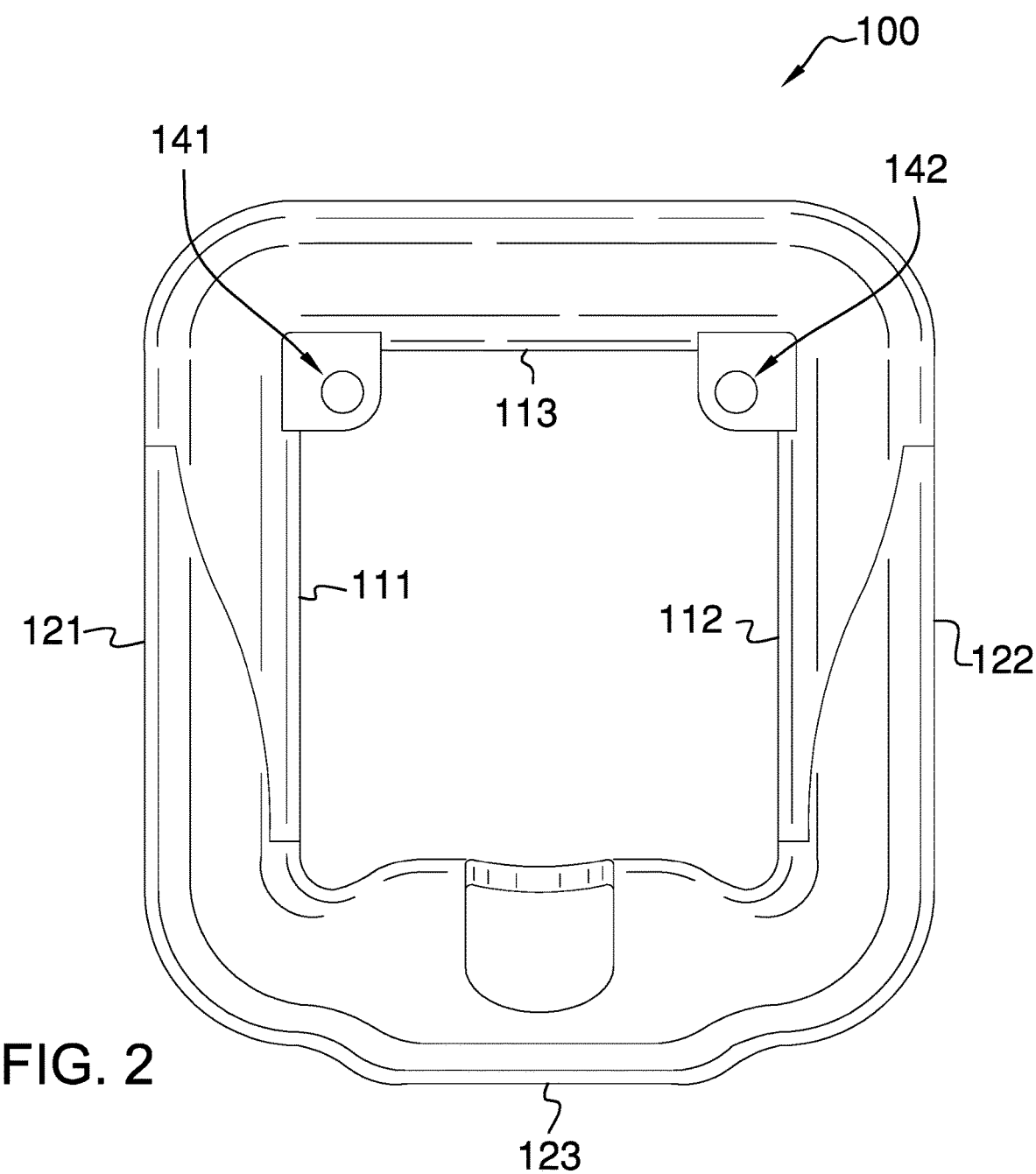
FIG. 2 is a front view of an embodiment of the disclosure.
Figure 3:
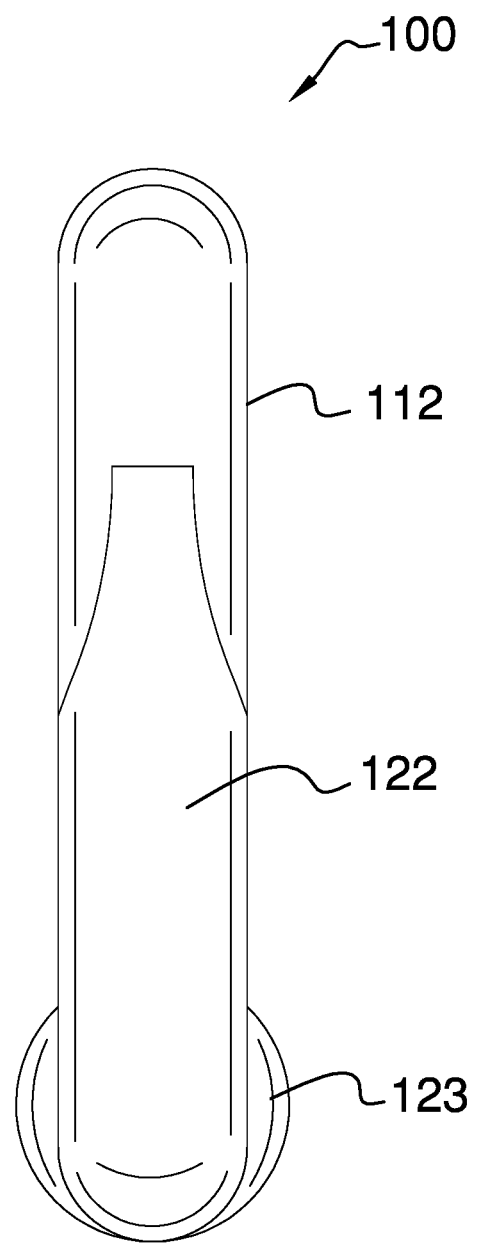
FIG. 3 is a side view of an embodiment of the disclosure.
Figure 4:
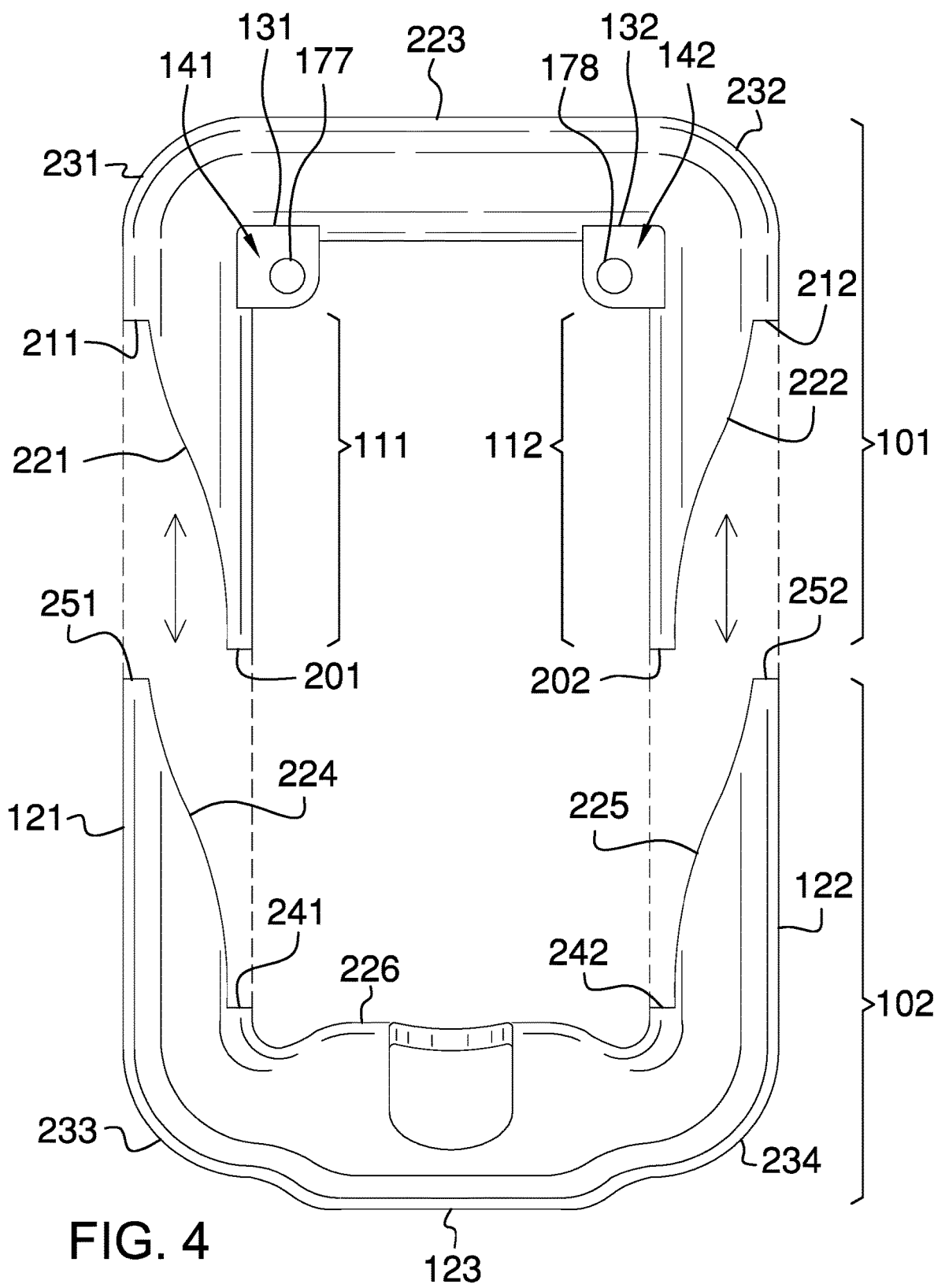
FIG. 4 is a top view of an embodiment of the disclosure.

Detailed reference will now be made to one or more potential embodiments of the disclosure, which are illustrated in FIGS. 1 through 5.

The portable leash anchor 100 (hereinafter invention) is configured for use with one or more leashes 171. Each of the one or more leashes 171 is a tether used to control an animal. The one or more leashes 171 attach to the invention 100. The invention 100 is a portable structure that: a) forms a handle for the one or more leashes 171 when walking an animal; and, b) creates a plurality of anchor points that temporarily anchor the one or more leashes 171 to a fixed position. The invention 100 comprises a first hyoid 101 and a second hyoid 102. The first hyoid 101 attaches to the one or more leashes 171. The first hyoid 101 is a stake structure that can be driven into a horizontal surface 172 to form the plurality of anchor points. The second hyoid 102 is a sheath structure that encloses the stake structure of the first hyoid 101 when the invention 100 is used as a handle.

The first hyoid 101 is a hyoid shaped structure. The one or more leashes 171 attach directly to the first hyoid 101. The first hyoid 101 forms a handle used to manage the one or more leashes 171. The first hyoid 101 further forms a stake structure. The first hyoid 101 can be driven into the horizontal surface 172 such that the first hyoid 101 anchors to the horizontal surface 172. The first hyoid 101 serves as an anchor point for the one or more leashes 171 such that the anchored one or more leashes 171 form tethers that limits the motion of an animal attached to the one or more leashes 171. The first hyoid 101 comprises a first arm 111, a second arm 112, and a first crossbeam 113.

The first arm 111 is further defined with a lower first end 201, a upper first end 211, and a first lateral face 221. The second arm 112 is further defined with a lower second end 202, a upper second end 212, and a second lateral face 222.

The first crossbeam 113 is further defined with a first corner 231, a second corner 232, and a third lateral face 223.

The first arm 111 is a pointed structure. The first arm 111 does not necessarily form a right point. The first arm 111 attaches to the first crossbeam 113 in the manner of a end 201 of the first arm 111 is formed such that the lower first end 201 of the first arm 111 can be driven into a horizontal surface 172 such as the ground. The upper first end 211 of the first arm 111 attaches to the first corner 231 of the first crossbeam 113 such that the center axis of the first arm 111 is perpendicular to the center axis of the first crossbeam 113.

The second arm 112 is a pointed structure. The second arm 112 does not necessarily form a right point. The second arm 112 attaches to the first crossbeam 113 in the manner of a cantilever. The second arm 112 forms a stake. The lower second end 202 of the second arm 112 is formed such that the lower second end 202 of the second arm 112 can be driven into a horizontal surface 172 such as the ground. The upper second end 212 of the second arm 112 attaches to the second corner 232 of the first crossbeam 113 such that the center axis of the second arm 112 is perpendicular to the center axis of the first crossbeam 113.

The first crossbeam 113 is a prism-shaped structure. The first crossbeam 113 attaches the first arm 111 to the second arm 112. The first crossbeam 113 forms the grip that allows the first hyoid 101 to be used as a handle. The one or more leashes 171 attach directly to the first crossbeam 113. The first second prismatic section 132, a first anchor point 141, and a second anchor point 142.

The first prismatic section 131 refers to a truncation formed at the first corner 231 of the first crossbeam 113. The first prismatic section 131 is located inside of where the first arm 111 joins the first crossbeam 113. The first prismatic section 131 is formed in preparation for the attachment of the first anchor point 141 to the first crossbeam 113.

The second prismatic section 132 refers to a truncation formed at the second corner 232 of the first crossbeam 113. The second prismatic section 132 is located inside of where the second arm 112 joins the first crossbeam 113. The second prismatic section 132 is formed in preparation for the attachment of the second anchor point 142 to the first crossbeam 113.

The first anchor point 141 is a first hole 177 formed in the first prismatic section 131 of the first crossbeam 113. The first anchor point 141 forms an attachment point that allows a leash selected from the one or more leashes 171 to be anchored to the first crossbeam 113.

The second anchor point 142 is a second hole 178 formed in the second prismatic section 132 of the first crossbeam 113. The second anchor point 142 forms an attachment point that allows a leash selected from the one or more leashes 171 to be anchored to the first crossbeam 113.

The second hyoid 102 is a hyoid shaped structure. The second hyoid 102 forms a sheath into which the first hyoid 101 inserts. The second hyoid 102 has a shape that works with the stake components of the first hyoid 101 such that the first hyoid 101 can be used as a handle without the potential of injury from sharp edges. The second hyoid 102 comprises a third arm 121, a fourth arm 122, and a second crossbeam 123.

The third arm 121 is further defined with a lower third end 241, an upper third end 251, and a fourth lateral face 224. The fourth arm 122 is further defined with a lower fourth end 242, a upper fourth end 252, and a fifth lateral face 225. The second crossbeam 123 is further defined with a third corner 233, a fourth corner 234, and a sixth lateral face 226.

The third arm 121 is a hollow prism-shaped structure that has a shape that mirrors that of the first arm 111. The third arm 121 attaches to the second crossbeam 123 in the manner of a cantilever. The fourth lateral face 224 of the third arm 121 aligns with and interfaces against the first lateral face 221 of the first arm 111. Moreover, the upper third end 251 of the third arm 121 interfaces against the upper first end 211 of the first arm 111; and the lower third end 241 of the third arm 121 The lower third end 241 of the third arm 121 attaches to the third corner 233 of the second crossbeam 123 such that the center axis of the third arm 121 is perpendicular to the center axis of the second crossbeam 123.

The fourth arm 122 is a hollow prism-shaped structure that has a shape that mirrors that of the second arm 112. The fourth arm 122 attaches to the second crossbeam 123 in the manner of a cantilever. The fifth lateral face 225 of the fourth arm 122 aligns with and interfaces against the second lateral face 222 of the second arm 112. Moreover, the upper fourth end 252 of the fourth arm 122 interfaces against the upper second end 212 of the second arm 112; and the lower fourth end 242 of the fourth arm 122 interfaces against the lower second end 202 of the second arm 112.

The lower fourth end 242 of the fourth arm 122 attaches to the fourth corner 234 of the second crossbeam 123 such that the center axis of the fourth arm 122 is perpendicular to the center axis of the second crossbeam 123. The fourth arm 122 further comprises a second latch 152.

The second crossbeam 123 is a prism-shaped structure. The second crossbeam 123 attaches the third arm 121 to the fourth arm 122. The second crossbeam 123 further comprises a storage compartment 161. The storage compartment 161 further comprises The storage compartment 161 is a negative space formed within the second crossbeam 123. The storage compartment 161 contains plastic bags commonly used to collect and store waste. The compartment aperture 162 is an aperture formed through the sixth lateral face 226 of the second crossbeam 123 such that the storage compartment 161 is accessible.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Apex: As used in this disclosure, an apex is a vertex that forms an extreme or solitary point of an object.

Base: As used in this disclosure, a base is the surface of a point that is distal from: a) the apex of a point; or, b) the truncated surface of a truncated point.

Bifurcate: As used in this disclosure, to bifurcate means to divide an object or space into two pieces or segments.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a point refers to a line formed through the apex of the point that is perpendicular to the base of the point. When the center axes of two cylinder, prism or pointed structures share the same line they are said to be aligned. When the center axes of two cylinder, prism or pointed structures do not share the same line they are said to be offset.

Cone: As used in this disclosure, a cone is a surface generated by rotating a triangle around one of the legs of the triangle. If a line that is perpendicular to the base that is drawn from the center of the base goes through the vertex of the triangle, then the cone is called a right cone. A cone is a type of quadric surface. The cone is a point with a circular base. The cone is further defined with an apex, a base, and a lateral face.

Detent: As used in this disclosure, a detent is a device for attaching a first object to a second object in a detachable manner such that: 1) the position of the first object relative to the second object is adjustable; and, 2) the first object is attached to the second object in a detachable manner.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Diametrically Opposed: As used in this disclosure, diametrically opposed is a term that describes the locations of a first object and a second object located at opposite ends of a diameter drawn through a third object. The term diametric opposition can also be used to describe this relationship.

Form Factor: As used in this disclosure, the term form factor refers to the size and shape of an object.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam; and, 3) the span of the length of the first arm roughly equals the span of the length of the second arm. Hyoids generally have a U shaped appearance.

Inner Dimension: As used in this disclosure, the term inner dimension describes the span from a first inside or interior surface of a container to a second inside or interior surface of a container. The term is used in much the same way that a plumber would refer to the inner diameter of a pipe.

Latch: As used in this disclosure, a latch is a fastening or locking mechanism. The use of the term latch does not necessarily but often implies the insertion of an object into a notch or cavity.

Lateral Face: As used in this disclosure, lateral face refers to the surface of a prism or pointed structure that joins the ends of the prism.

Leash: As used in this disclosure, a leash is a tether that is used to control the movements of an animal.

Loop: As used in this disclosure, a loop is the length of a first structure including, that is folded or curved to form a closed or nearly closed space such that a linear structure such as a second line, a cord or a hook can be inserted through the space formed within the first structure. Within this disclosure, the first structure is said to be looped around the linear structure.

Negative Space: As used in this disclosure, negative space is a method of defining an object through the use of open or empty space as the definition of the object itself, or, through the use of open or empty space to describe the boundaries of an object.

N-gon: As used in this disclosure, an N-gon is a regular polygon with N sides wherein N is a positive integer number greater than 2.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prismatic Section: As used in this disclosure, a prismatic section refers either one of the two objects formed by the bifurcation of a prism by a plane that: 1) passes through the center axis of the prism; and 2) does not perpendicularly intersect the center axis of the prism. The angle of the prismatic section is the angle formed between the bifurcating plane and a line that is perpendicular to the center axis of the prism.

Point: As used in this disclosure, a point is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the point is referred to as a right point. Points can be further formed with circular or elliptical bases which are commonly referred to as cone or an elliptical point respectively. A point is defined with a base, an apex, and a lateral face. The base is the N-gon shaped base described above. The apex is the convergence point described above. The lateral face is formed from the N triangular faces described above.

Radial: As used in this disclosure, the term radial refers to a direction that: 1) is perpendicular to an identified central axis; or, 2) projects away from a center point.

Sheath: As used in this disclosure, a sheath is a shell that is used to cover an object and from which the object may be inserted and withdrawn.

Shell: As used in this disclosure, a shell is a structure that forms an outer covering intended to contain an object. Shells are often, but not necessarily, rigid or semi-rigid structures that are intended to protect the object contained within it.

Stake: As used in this disclosure, a stake is a shaft that is driven into a horizontal surface, such as the ground, to serve as an anchor point.

Tether: As used in this disclosure, a tether is a cord, line, webbing, or strap that is attached to an object to restrict its movement.

Truncated: As used in this disclosure, a geometric object is truncated when an apex, vertex, or end is cut off by a line or plane.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertex: As used in this disclosure, a vertex (plural vertices) is an angle that is formed by two lines that form a point. Vertices are commonly found in polygons.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and

What is claimed is:

1. A tethering structure comprising:
a first hyoid and a second hyoid;
wherein the first hyoid attaches to the second hyoid in order to form a square-shaped body when the tethering structure is not in use;
wherein the tethering structure is configured for use with one or more leashes;
wherein the one or more leashes attach to the tethering structure;
wherein the tethering structure forms a handle for the one or more leashes;
wherein the tethering structure comprises a plurality of anchor points that anchor the one or more leashes to a fixed position when the first hyoid is detached from the second hyoid.

2. The tethering structure according to claim 1
wherein the first hyoid attaches to the one or more leashes;
wherein the first hyoid forms the handle;
wherein the first hyoid forms a stake structure.

3. The tethering structure according to claim 2
wherein the second hyoid forms a sheath structure.

4. The tethering structure according to claim 3
wherein the first hyoid is a hyoid shaped structure;
wherein the first hyoid is driven into a horizontal surface such that the first hyoid anchors to the horizontal surface;
wherein the first hyoid serves as an anchor point for the one or more leashes such that the anchored one or more leashes form tethers that limit the motion of objects attached to the one or more leashes.

5. The tethering structure according to claim 4
wherein the second hyoid is a hyoid shaped structure;
wherein the second hyoid forms a sheath into which the first hyoid inserts.

6. The tethering structure according to claim 5
wherein the first hyoid comprises a first arm, a second arm, and a first crossbeam;
wherein the first crossbeam attaches the first arm to the second arm;
wherein the first arm is further defined with a lower first end, an upper first end, and a first lateral face;
wherein the second arm is further defined with a lower second end, an upper second end, and a second lateral face;
wherein the first crossbeam is further defined with a first corner, a second corner, and a third lateral face.

7. The tethering structure according to claim 6
wherein the second hyoid comprises a third arm, a fourth arm, and a second crossbeam;
wherein the second hyoid attaches the third arm to the fourth arm;
wherein the third arm is further defined with a lower third end, an upper third end, and a fourth lateral face;
wherein the fourth arm is further defined with a lower fourth end, an upper fourth end, and a fifth lateral face;
wherein the second crossbeam is further defined with a third corner, a fourth corner, and a sixth lateral face.

8. The tethering structure according to claim 7
wherein the first crossbeam is a prism-shaped structure;
wherein the first crossbeam forms the handle;
wherein the one or more leashes attach directly to the first crossbeam.

9. The tethering structure according to claim 8
wherein the second crossbeam is a prism-shaped structure;

wherein the second crossbeam attaches the third arm to the fourth arm.

10. The tethering structure according to claim 9
wherein the first arm is a pointed structure;
wherein the first arm attaches to the first crossbeam in the manner of a cantilever;
wherein the first arm forms a first stake;
wherein the second arm is a pointed structure;
wherein the second arm attaches to the first crossbeam in the manner of a cantilever;
wherein the second arm forms a second stake.

11. The tethering structure according to claim 10
wherein the third arm is a hollow prism-shaped structure that forms a sheath;
wherein the third arm is formed as a capped tube;
wherein the third arm attaches to the second crossbeam in the manner of a cantilever;
wherein the upper third end is the open end of the capped tube structure of the third arm;
wherein the fourth arm is a hollow prism-shaped structure that forms a sheath;
wherein the fourth arm is formed as a capped tube;
wherein the upper fourth end is the open end of the capped tube structure of the fourth arm;
wherein the fourth arm attaches to the second crossbeam in the manner of a cantilever.

12. The tethering structure according to claim 11
wherein the lower first end of the first arm is formed such that the lower first end of the first arm is driven into a horizontal surface;
wherein the lower second end of the second arm is formed such that the lower second end of the second arm is driven into a horizontal surface.

13. The tethering structure according to claim 12
wherein the upper first end of the first arm attaches to the first corner of the first crossbeam such that the center axis of the first arm is perpendicular to the center axis of the first crossbeam;
wherein the upper second end of the second arm attaches to the second corner of the first crossbeam such that the center axis of the second arm is perpendicular to the center axis of the first crossbeam.

14. The tethering structure according to claim 13
wherein the first crossbeam further comprises a first prismatic section, a second prismatic section, a first anchor point, and a second anchor point;
wherein the first prismatic section and the second prismatic section are formed in the first crossbeam
wherein the first anchor point and the second anchor point attach to the first crossbeam.

15. The tethering structure according to claim 14
wherein the first prismatic section is located inside of where the first arm joins the first crossbeam;
wherein the second prismatic section is located inside of where the second arm joins the first crossbeam.

16. The tethering structure according to claim 15
wherein the first anchor point includes a first hole that is formed in the first prismatic section of the first crossbeam;
wherein the second anchor point includes a second hole that is formed in the second prismatic section of the first crossbeam;
wherein the first anchor point forms an attachment point that allows a leash selected from the one or more leashes to anchor to the first crossbeam;
wherein the second anchor point forms an attachment point that allows a leash selected from the one or more leashes to anchor to the first crossbeam.

17. The tethering structure according to claim 16
wherein the fourth lateral face of the third arm aligns with and interfaces against the first lateral face of the first arm;
wherein the upper third end of the third arm interfaces against the upper first end of the first arm;
wherein the lower third end of the third arm interfaces against the lower first end of the first arm;
wherein the fifth lateral face of the fourth arm aligns with and interfaces against the second lateral face of the second arm;
wherein the upper fourth end of the fourth arm interfaces against the upper second end of the second arm;
wherein the lower fourth end of the fourth arm interfaces against the lower second end of the second arm.

18. The tethering structure according to claim 17
wherein the lower third end of the third arm attaches to the third corner of the second crossbeam such that the center axis of the third arm is perpendicular to the center axis of the second crossbeam;
wherein the lower fourth end of the fourth arm attaches to the fourth corner of the second crossbeam such that the center axis of the fourth arm is perpendicular to the center axis of the second crossbeam.

19. The tethering structure according to claim 18
wherein the second crossbeam further comprises a storage compartment;
wherein the storage compartment further comprises a compartment aperture;
wherein the storage compartment is a negative space formed within the second crossbeam;
wherein the compartment aperture is an aperture formed through the sixth lateral face of the second crossbeam.

* * * * *